(12) United States Patent
Rash et al.

(10) Patent No.: US 10,073,513 B2
(45) Date of Patent: *Sep. 11, 2018

(54) PROTECTED POWER MANAGEMENT MODE IN A PROCESSOR

(71) Applicant: Intel Corporation, Santa Clara, CA (US)

(72) Inventors: William C. Rash, Saratoga, CA (US); Martin G. Dixon, Portland, OR (US); Yazmin A. Santiago, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/133,688

(22) Filed: Apr. 20, 2016

(65) Prior Publication Data

US 2016/0342196 A1 Nov. 24, 2016

Related U.S. Application Data

(63) Continuation of application No. 13/930,044, filed on Jun. 28, 2013, now Pat. No. 9,354,681.

(51) Int. Cl.
*G06F 1/32* (2006.01)
*G06F 1/26* (2006.01)
*G06F 9/30* (2018.01)

(52) U.S. Cl.
CPC ............ *G06F 1/3287* (2013.01); *G06F 1/26* (2013.01); *G06F 1/3203* (2013.01); *G06F 1/3206* (2013.01); *G06F 1/3234* (2013.01); *G06F 1/3246* (2013.01); *G06F 1/3275* (2013.01); *G06F 9/30083* (2013.01); *G06F 9/30101* (2013.01); *G06F 9/30189* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | |
|---|---|---|
| 5,297,282 A | 3/1994 | Meilak et al. |
| 6,633,940 B1 | 10/2003 | Alasti et al. |
| 6,711,692 B1 | 3/2004 | Maeda et al. |
| 6,792,550 B2 | 9/2004 | Osecky et al. |
| 8,892,803 B2 | 11/2014 | Lee |

(Continued)

OTHER PUBLICATIONS

European Patent Office, European Search Report on European Patent Application No. EP14174594, dated Dec. 2, 2014, in European Patent Application No. 14174594.3.

*Primary Examiner* — Zahid Choudhury
(74) *Attorney, Agent, or Firm* — Trop, Pruner & Hu, P.C.

(57) ABSTRACT

In an embodiment, a processor includes a plurality of cores. Each core includes a core power unit to detect one or more power management events, and in response to the one or more power management events, initiate a protected power management mode in the core. Software interrupts to the core may be disabled during the protected power management mode. The core is to execute power management code during the protected power management mode. Other embodiments are described and claimed.

20 Claims, 8 Drawing Sheets

(56) References Cited

U.S. PATENT DOCUMENTS

| | | |
|---|---|---|
| 2001/0003206 A1 | 6/2001 | Pole, II et al. |
| 2002/0112192 A1 | 8/2002 | Torimaru et al. |
| 2003/0061526 A1 | 3/2003 | Hashimoto |
| 2006/0149975 A1 | 7/2006 | Rotem et al. |
| 2006/0253716 A1 | 11/2006 | Dhiman et al. |
| 2008/0168285 A1 | 7/2008 | de Cesare et al. |
| 2010/0218183 A1 | 8/2010 | Wang et al. |
| 2012/0131356 A1 | 5/2012 | Han |
| 2012/0284550 A1 | 11/2012 | Park |
| 2013/0198549 A1* | 8/2013 | Longnecker .......... G06F 1/3237 713/324 |

\* cited by examiner

PROTECTED POWER MANAGEMENT MODE IN A PROCESSOR

This application is a continuation of U.S. patent application Ser. No. 13/930,044, filed Jun. 28, 2013, the content of which is hereby incorporated by reference.

TECHNICAL FIELD

Embodiments relate generally to power management of electronic devices.

BACKGROUND

Conventionally, an electronic device may include one or more power states. Each power state may correspond to a particular combination of performance level and power consumption. The use of such power states may decrease the total amount of electrical power consumed by the electronic device.

DETAILED DESCRIPTION

Figure 1:
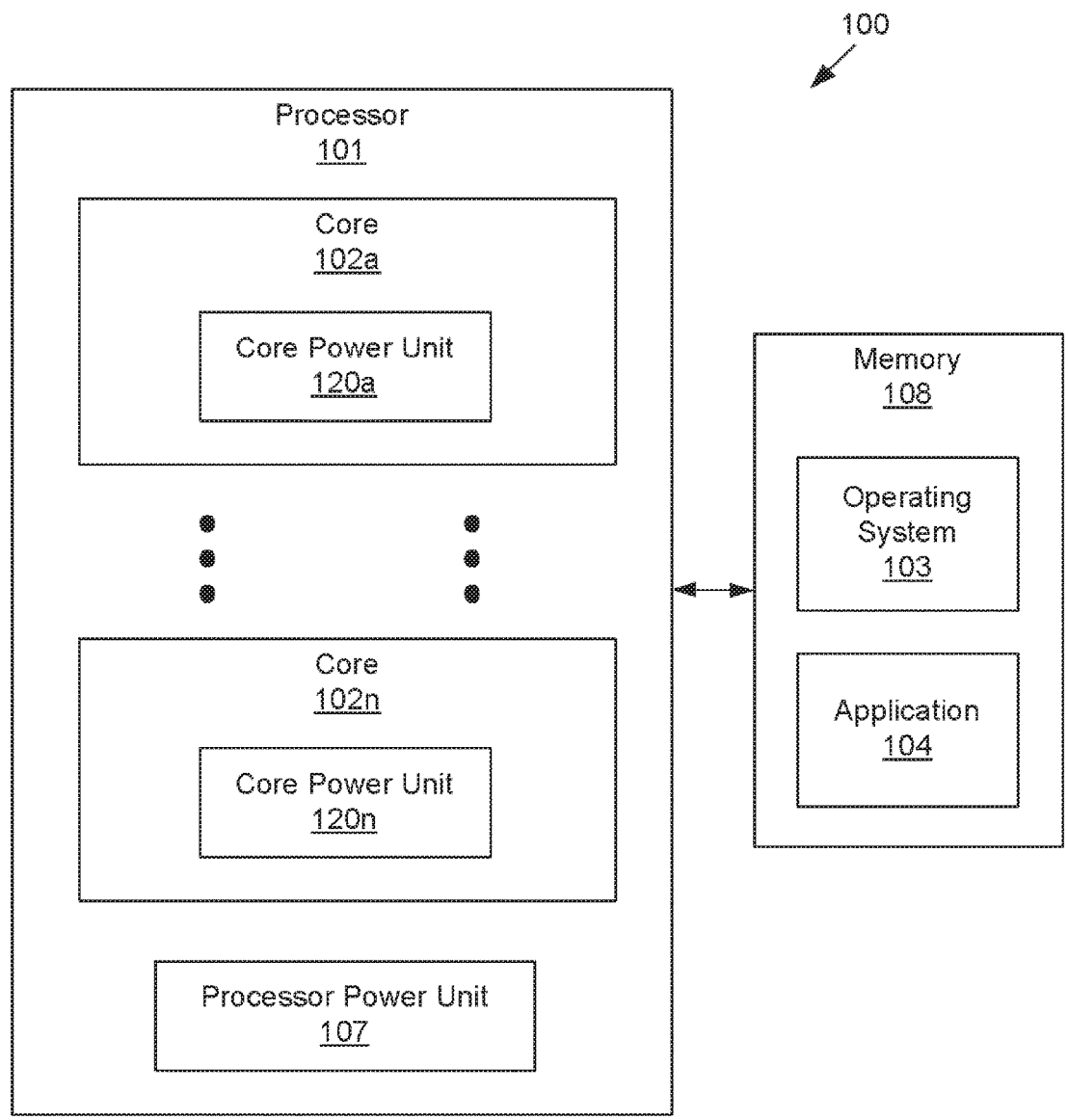
FIG. 1 is a block diagram in accordance with one or more embodiments.

Conventional processors may include power management (PM) functionality implemented in microcode. Microcode typically includes a series of microinstructions that may be stored in a special read-only memory (referred to as the "control store"). Such microcode is executed by a small, fast execution engine (referred to as a "microengine") included in the processor. Alternatively, some conventional processors may implement power management by including a PM sub-processor, meaning an independent component dedicated to PM functions (e.g., an intellectual property block). However, neither microcode or PM sub-processors are directly aware of the execution state of the processor. Therefore, these techniques may require reading and transferring of state information from the processor in order to perform PM functions.

In accordance with some embodiments, a processor may include dedicated PM hardware. The PM hardware may include functionality to initiate a protected PM mode based on detected PM events. The protected PM mode may disable software interrupts, thereby enabling the processor to execute PM code without interruption. This functionality may be implemented without using microcode or PM sub-processors. Further, this functionality includes direct awareness of the execution state of the processor. As such, embodiments may provide improved performance and reduced complexity for power management.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below.

Moreover, the apparatus, methods, and systems described herein are not limited to physical computing devices, but may also relate to software optimizations for energy conservation and efficiency. As will become readily apparent in the description below, the embodiments of methods, apparatus, and systems described herein (whether in reference to hardware, firmware, software, or a combination thereof) are vital to a 'green technology' future, such as for power conservation and energy efficiency in products that encompass a large portion of the US economy.

Note that embodiments described herein may be independent of and/or complementary to an operating system (OS)-based mechanism, such as the Advanced Configuration and Power Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Referring to FIG. 1, shown is a block diagram of a system 100 in accordance with one or more embodiments. In some embodiments, the system 100 may be all or a portion of an electronic device or component. For example, the system 100 may be a cellular telephone, a computer, a server, a network device, a controller, an appliance, etc.

As shown in FIG. 1, the system 100 may include a processor 101 coupled to a memory 108. The memory 108 may be any type of computer memory (e.g., dynamic random access memory (DRAM), static random-access memory (SRAM), non-volatile memory, etc.). In one or more embodiments, the memory 108 may store an operating system (OS) 103 and at least one application 104.

As shown, in some embodiments, the processor 101 may be a multicore processor including cores 102a-102n. For example, in some embodiments, the cores 102a-102n may be included in multiple tiles within a single die of the processor 101. One or more of the cores 102a-102n may execute the OS 103 and/or the application 104.

As shown, in one or more embodiments, each core 102 may include a core power unit 120. In some embodiments, the core power unit 120 may include functionality to enable—the core 102 to directly control and/or execute its own power management. Such functionality may include detecting PM events, meaning one or more events affecting PM functions of the core 102. The detected PM events may relate to, e.g., temperature levels, voltage levels, electrical characteristics, time periods, interrupts from the operating system, etc. Further, in some embodiments, the core power unit 120 may include functionality to initiate a protected PM mode in the core 102 responsive to detected PM events. The protected PM mode may disable interrupts and/or exceptions that may interfere with PM functions. This functionality may also include storing the execution state of the processor prior to entering the protected PM mode. The functionality of the core power unit 120 is described further below with reference to FIG. 2.

As shown, in some embodiments, the processor 101 may include a processor power unit 107. In one or more embodiments, the processor power unit 107 may include functionality to control the overall PM state of the processor 101. For example, in some embodiments, the processor power unit 107 may interact with the core power units 120a-120n in order to coordinate power management functions across the cores 102a-102n. Further, in some embodiments, the processor power unit 107 may perform power management functions such as reducing frequency, reducing voltage, turning components on/off, etc.

Figure 2:
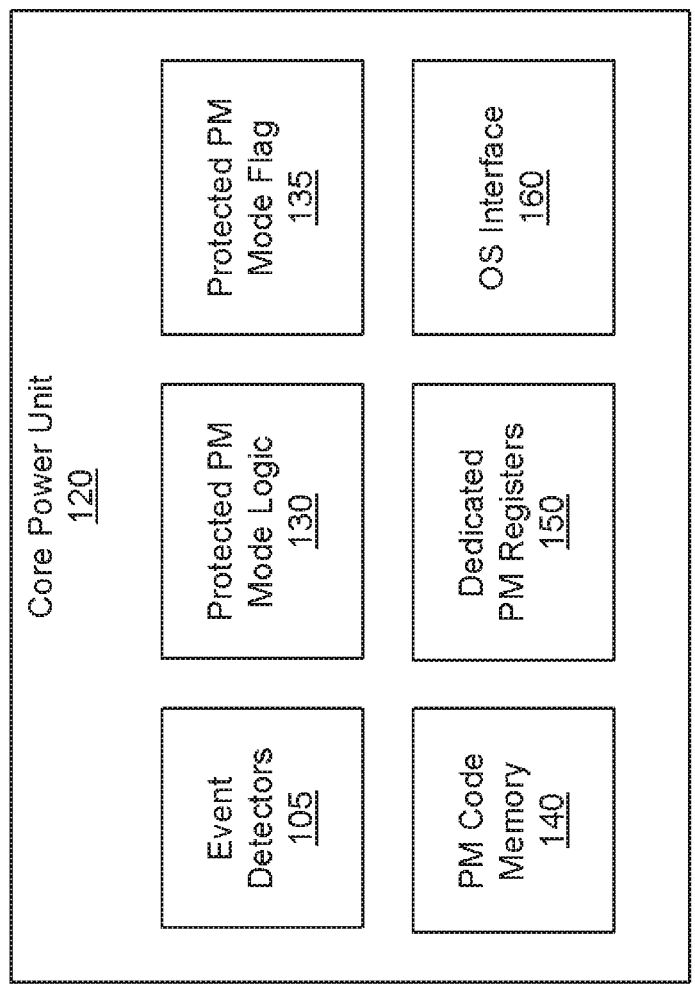
FIG. 2 is a block diagram in accordance with one or more embodiments.

Referring now to FIG. 2, shown is an example embodiment of a core power unit 120. As shown, the core power unit 120 may include various hardware components, including one or more event detectors 105, protected PM mode logic 130, a protected PM mode flag 135, PM code memory 140, dedicated PM registers 150, and an OS interface 160.

In one or more embodiments, the event detectors 105 may include functionality to detect PM events. For example, the event detectors 105 may include a temperature sensor to determine whether the temperature of the core 102 has reached a threshold level. In another example, the event detectors 105 may include a voltage sensor to determine whether a voltage of the power supply to the core 102 has reached a threshold level. In yet another example, the event detectors 105 may include a clock or timer to determine whether a time period has expired.

In one or more embodiments, the OS interface 160 may include functionality to enable the OS 103 to communicate directly with the core power unit 120. For example, the OS interface 160 may receive a PM interrupt, meaning an interrupt or request from the OS 103 to perform a particular PM function in the core 102. In some embodiments, receiving a PM interrupt from the OS 103 may be considered to be a PM event.

In some embodiments, the OS interface 160 may be formally defined and standardized for one or more hardware/software platforms. Thus, in some embodiments, the functionality of the core power unit 120 may be available across multiple generations of the processor 101, across various hardware platforms, across multiple types of operating systems, etc.

In one or more embodiments, the protected PM mode logic 130 may include functionality to initiate and/or terminate a protected PM mode in the core 102. Further, in some embodiments, the protected PM mode logic 130 may initiate and/or terminate the protected PM mode in response to one or more PM events detected by the event detectors 105 and/or the OS interface 160. For example, the protected PM mode logic 130 may initiate the protected PM mode if the event detectors 105 determine that the temperature of the core 102 has exceeded a maximum level and/or the voltage of the core 102 has dropped below a minimum level. In another example, the protected PM mode logic 130 may terminate the protected PM mode if the event detectors 105 determine that a maximum time period for the protected PM mode has expired. Further, in some embodiments, the protected PM mode logic 130 may set the protected PM mode flag 135 to indicate whether the core 102 is operating in the protected PM mode. For example, the protected PM mode flag 135 may be set to "1" to indicate that the core 102 is currently in the protected PM mode, and may be set to "0" to indicate that the core 102 is not currently in the protected PM mode.

In one or more embodiments, when the core 102 is operating in the protected PM mode, software interrupts to the core 102 may be disabled. As used herein, "software interrupts" may refer to interrupts and/or exceptions other than the PM interrupts received through the OS interface 160. In some embodiments, such software interrupts may not be related to PM functionality of the core 102. For example, when operating in the protected PM mode, the core 102 may ignore any interrupts or exceptions issued by a device driver, interrupts or exceptions resulting from the execution of the application 104 or from non-PM related aspects of the OS 103, page faults, privilege exceptions, etc. In some embodiments, the protected PM mode logic 130 may include functionality to intercept such software interrupts before they reach the core 102, thereby enabling the core 102 to perform PM functions without interruption from the OS 103 or the application 104. Further, in some embodiments, the protected PM mode logic 130 may store the software interrupts occurring during the protected PM mode. Such stored software interrupts may then be handled when the core 102 exits the protected PM mode. Furthermore, in some embodiments, the protected PM mode logic 130 may set flags to indicate any the software interrupts occurring during the protected PM mode. Such flags may be dedicated hardware flags for use during the protected PM mode, and/or existing flags that may be redefined during the protected PM mode to indicate the occurrence of the software interrupts.

In one or more embodiments, initiating the protected PM mode may cause the core 102 to execute PM code stored in the PM code memory 140. Further, in some embodiments, the core 102 may fetch the PM code directly from the PM code memory 140 (e.g., without using intervening components such as a memory management unit, a translation lookaside buffer, etc.). Such direct access may enable rapid execution of the PM code in some situations (e.g., when the core 102 is restarted after being fully powered off). In some embodiments, during the protected PM mode, the core 102 may execute the PM code regardless of the execution state of the OS 103. Further, in some embodiments, completing the execution of the PM code may be considered to be a PM event.

In one or more embodiments, the PM code may be executed to perform PM actions in the core 102. For example, PM actions may include reducing/increasing frequency, reducing/increasing voltage, turning components on/off, etc. Further, PM actions may include handling stored software interrupts, flags indicating exceptions occurring during the protected PM mode, etc. In addition, PM actions may include reading information regarding PM status, such as temperature, voltage, time, energy estimates, etc. Furthermore, PM actions may include sending commands to the processor power unit 107 to perform preprogrammed activities after the PM code completes execution. In some embodiments, the processor power unit 107 may include fixed state machines to carry out these preprogrammed activities to completion.

In one or more embodiments, the PM code stored in the PM code memory 140 may be implemented with instruction set architecture (ISA) instructions. These ISA instructions may be, e.g., macroinstructions, assembly language instructions, or other instructions to be decoded and executed by the core 102. Thus, in one or more embodiments, the PM code is not implemented in microcode.

In some embodiments, the PM code may include standard ISA instructions, which may be executed in accordance with their conventional function or meaning. Further, the PM code may also include non-standard instructions which may be newly defined to enable the core 102 to perform PM functions which are not provided by the standard instructions. In addition, the PM code may also include redefined instructions, meaning standard ISA instructions which are interpreted with a different or modified behavior when the core 102 is operating in the protected PM mode.

In one or more embodiments, some new and/or redefined instructions may enable the core 102 to ignore or disable software interrupts which may interfere with PM functions. For example, in some embodiments, a standard "halt" instruction may be redefined to ignore an interrupt for a given number of clock cycles, until PM code is completed, etc. Further, some new and/or redefined instructions may enable the core 102 access hardware functions or controls that are not accessible through standard instructions. For example, a new instruction may enable the core 102 access to normally-inaccessible voltage controls, frequency controls, data registers, etc.

In one or more embodiments, during the protected PM mode, one or more existing flags may be interpreted with modified or new meanings. For example, assume that a given flag has a particular meaning in normal operation (e.g., an overflow flag). Assume further that this particular meaning has no usefulness or relevancy during the protected PM mode. Thus, in this example, this flag may be redefined during the protected PM mode to a different meaning that is useful to execute the PM code.

In one or more embodiments, the PM code memory 140 may be implemented using persistent and/or non-volatile memory. For example, in some embodiments, the PM code memory 140 may be a set of physical registers included in the core 102. Further, in some embodiments, the PM code memory 140 may be protected, and may only be updated using a dedicated updating process.

In one or more embodiments, the protected PM mode logic 130 may, along with (or as part of) initiating the protected PM mode, store information about the execution state of the core 102 in the dedicated PM registers 150. In some embodiments, the dedicated PM registers 150 are on-die processor storage locations that may store execution state information (e.g., variables, results, flags, instructions, settings, pointers, etc.). Further, in some embodiments, the dedicated PM registers 150 may store information about the event and/or condition that caused the protected PM mode to be initiated in the core 102 (e.g., due to a temperature event, due to an OS request, etc.). In some embodiments, the protected PM mode logic 130 may use the information stored in the dedicated PM registers 150 to restore the core 102 to its previous state after completing the protected PM mode.

In some embodiments, the dedicated registers 150 may include functionality to maintain their settings during various system events. For example, the dedicated registers 150 may be non-volatile memory, and may be maintained during a full power shutdown. In another example, the dedicated registers 150 may be static random-access memory (SRAM), and may thus be maintained across a logic reset or restart. The dedicated registers 150 may include, e.g., a set of physical registers to store packed data, floating point data, integer data, general purpose data, etc.

Figure 3A:
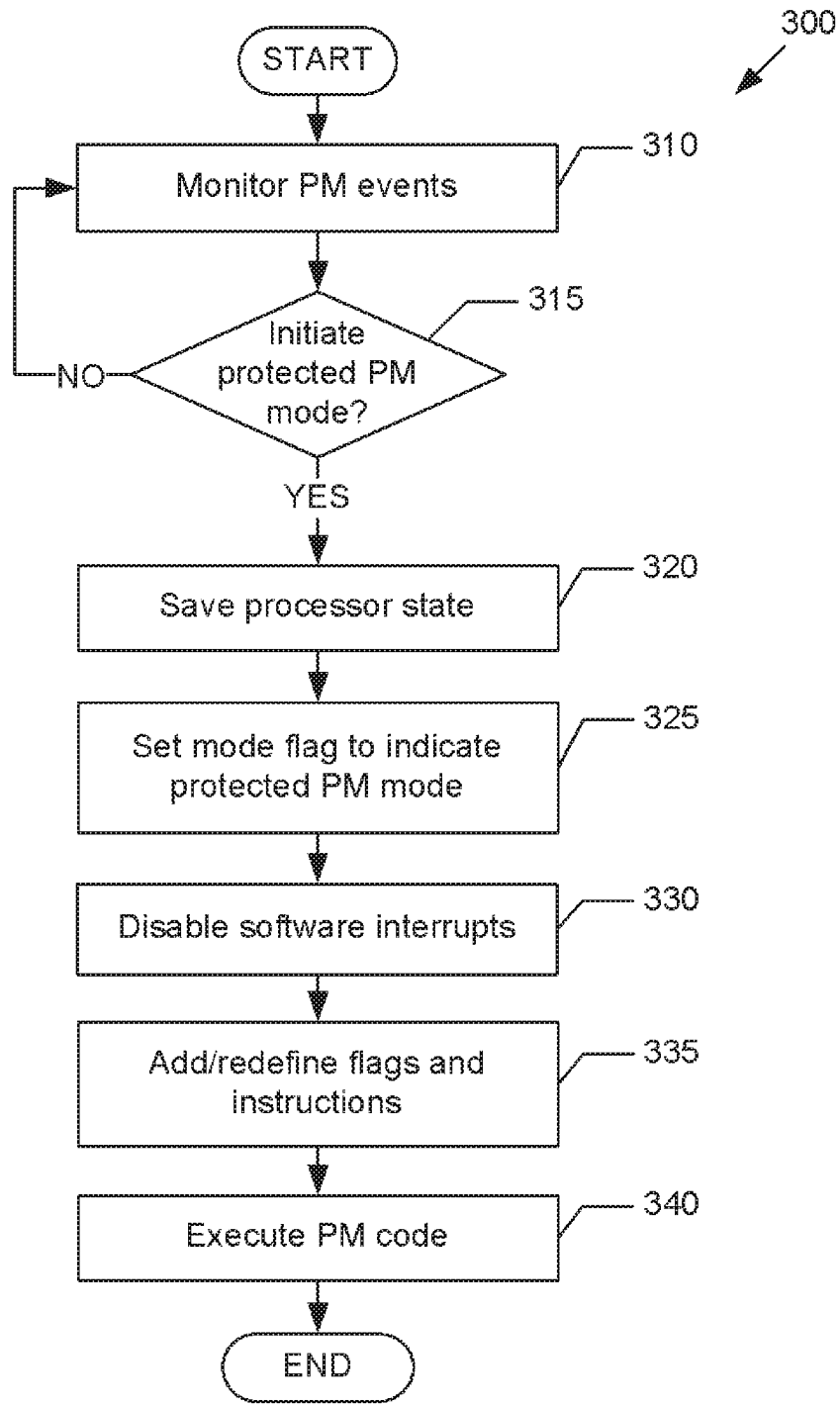
FIGS. 3A-3B are sequences in accordance with one or more embodiments.

Referring now to FIG. 3A, shown is a sequence 300 for initiating a protected PM mode, in accordance with one or more embodiments. In one or more embodiments, the sequence 300 may be part of the core power unit 120 shown in FIGS. 1-2. The sequence 300 may be implemented in hardware, software, and/or firmware. In firmware and software embodiments it may be implemented by computer executed instructions stored in a non-transitory computer readable medium, such as an optical, semiconductor, or magnetic storage device.

At step 310, one or more PM events of a processor may be monitored. For example, referring to FIGS. 1-2, the event detectors 105 or the OS interface 160 may determine whether a PM event has occurred in the core 102. Such PM events may include, e.g., a temperature threshold is reached, a voltage threshold is reached, a time period has expired, the OS 103 issues a request, etc.

At step 315, a determination is made about whether a protected PM mode is to be initiated in the processor. For example, referring to FIG. 2, the protected PM mode logic 130 may determine whether to initiate a protected PM mode based on the one or more PM events (monitored at step 310).

If it is determined at step 315 that a protected PM mode is not initiated, then the sequence 300 may return to step 310 to continue monitoring for PM events. However, if it is determined at step 315 that a protected PM mode is initiated, then the sequence 300 continues to step 320.

At step 320, the execution state of the processor may be saved. For example, referring to FIGS. 1-2, the protected PM mode logic 130 may store the current execution state information of the core 102 in the dedicated PM registers 150. Further, information about the PM event that caused the protected PM mode to be initiated may also be stored in the dedicated PM registers 150.

At step 325, a mode flag may be set to indicate that the processor is operating in protected PM mode. For example, referring to FIGS. 1-2, the protected PM mode flag 135 may be set to the value "1," thereby indicating that the core 102 is currently operating in the protected PM mode.

At step 330, software interrupts may be disabled in the processor. For example, referring to FIGS. 1-2, the protected PM mode logic 130 may disable any interrupts or exceptions not received through the OS interface 160. In some embodiments, the protected PM mode logic 130 may intercept such software interrupts before they reach the core 102, and may optionally store these interrupts until the core 102 exits the protected PM mode.

At step 335, one or more flags and instructions may be added or redefined during the protected PM mode. For example, referring to FIGS. 1-2, the protected PM mode logic 130 may enable new instructions and/or flags for use during the protected PM mode. Further, the core power unit 120 may redefine existing instructions and/or flags to have new meanings during the protected PM mode. In some embodiments, some new and/or redefined instructions may enable the core 102 to ignore or delay software interrupts during the protected PM mode. Thus, such instructions may be used as part of disabling software interrupts (i.e., step 330).

At step 340, PM code may be executed during the protected PM mode. For example, referring to FIGS. 1-2, the core power unit 120 may cause the core 102 to execute PM code stored in the PM code memory 140. In some embodiments, the core 102 may fetch the PM code directly from the PM code memory 140, without using any intervening memory components (e.g., a memory management unit, a translation lookaside buffer, etc.). Further, in some embodiments, the core 102 may execute the PM code without evaluating the prior execution state of the OS 103 (e.g., prior to entering the protected PM mode). After step 340, the sequence 300 ends.

Figure 3B:
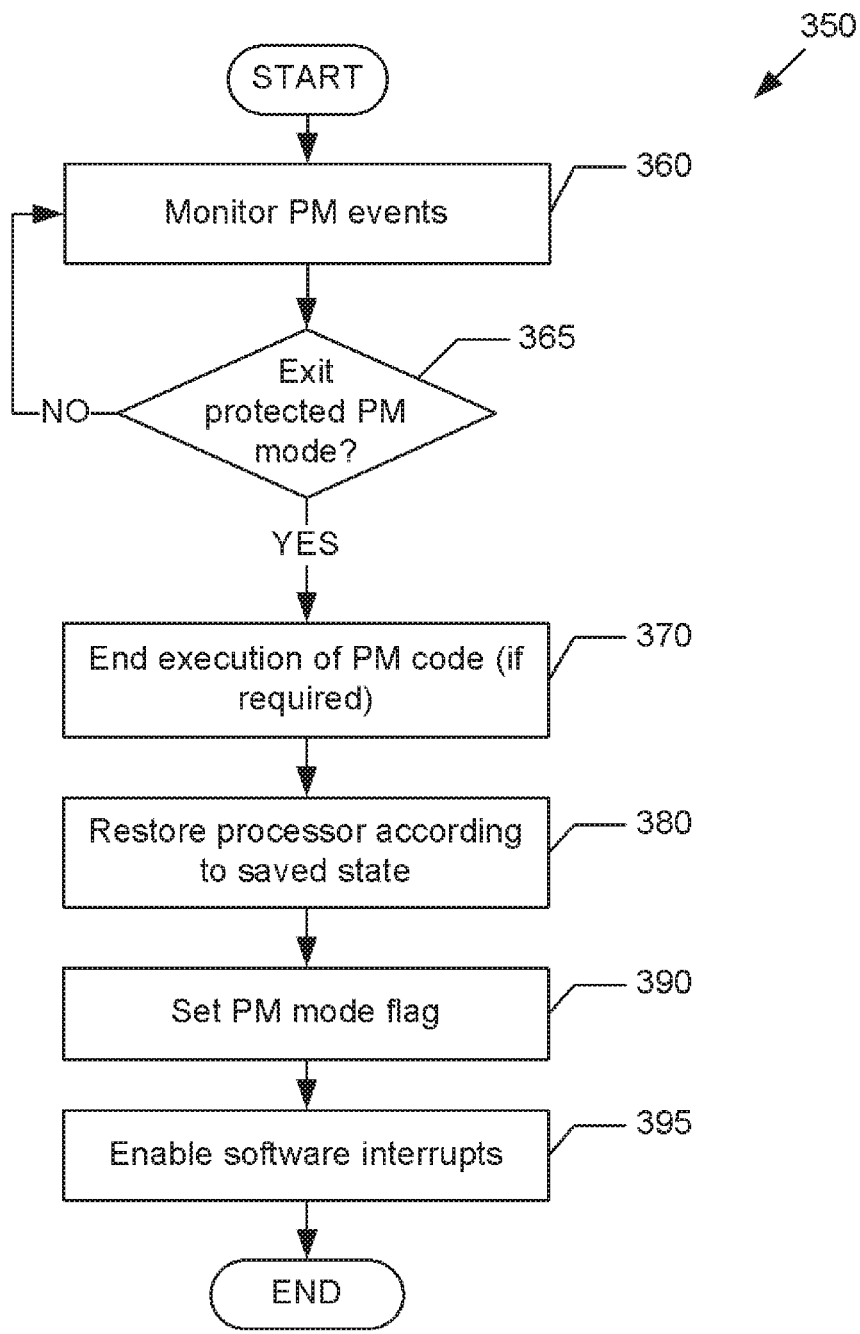

Referring now to FIG. 3B, shown is a sequence 350 for exiting a protected PM mode, in accordance with one or more embodiments. In one or more embodiments, the sequence 350 may be part of the core power unit 120 shown in FIG. 1B. Further, in some embodiments, the sequence 350 may be subsequent to the sequence 300 shown in FIG. 3A. The sequence 350 may be implemented in hardware, software, and/or firmware. In firmware and software embodiments it may be implemented by computer executed instructions stored in a non-transitory computer readable medium, such as an optical, semiconductor, or magnetic storage device.

At step 360, one or more PM events of a processor may be monitored. For example, referring to FIGS. 1-2, the event detectors 105 or the OS interface 160 may determine whether a PM event has occurred in the core 102. Such PM events may occur, e.g., during execution of PM code stored in the PM code memory 140. Further, such PM events may include, e.g., a temperature threshold is reached, a voltage threshold is reached, a time period has expired, the OS 103 issues a request, the PM code has completed execution, etc.

At step 365, a determination is made about whether the processor is to exit a protected PM mode. For example, referring to FIG. 2, the protected PM mode logic 130 may determine whether the core 102 is to exit from a protected PM mode based on the one or more PM events. In some embodiments, this protected PM mode may have been initiated in the core 102 using the sequence 300 described above with reference to FIG. 3A.

If it is determined at step 365 that the processor is not to exit the protected PM mode, then the sequence 350 may return to step 360 to continue monitoring for PM events. In addition, the PM code may process a PM event as a result of returning to step 360. However, if it is determined at step 365 that the processor is to exit the protected PM mode, then the sequence 350 continues to step 370.

At step 370, if the PM code has not finished executing, the execution of PM code may be terminated. For example, referring to FIGS. 1-2, the protected PM mode logic 130 may cause the core 102 to complete execution of the PM code stored in the PM code memory 140. The execution of the PM code may be allowed to complete, may be terminated at a defined exit point, may be processed by a clean-up routine, etc.

At step 380, the processor may be restored according to a saved execution state. For example, referring to FIGS. 1-2, the protected PM mode logic 130 may read information about the saved execution state of the core 102 from the dedicated PM registers 150. Further, the protected PM mode logic 130 may restore the core 102 according to this state information. Optionally, the saved state information may include any software interrupts that were intercepted by the protected PM mode logic 130 during the protected PM mode.

At step 390, a PM mode flag may be set to indicate that the processor is not operating in protected PM mode. For example, referring to FIGS. 1-2, the protected PM mode flag 135 may be set to the value "0," thereby indicating that the core 102 is not operating in the protected PM mode.

At step 395, software interrupts may be enabled in the processor. For example, referring to FIGS. 1-2, the protected PM mode logic 130 may enable software interrupts to function normally (e.g., to reach the core 102). After step 395, the sequence 350 ends.

Note that the examples shown in FIGS. 1, 2, 3A, and 3B are provided for the sake of illustration, and are not intended to limit any embodiments. For instance, while embodiments may be shown in simplified form for the sake of clarity, embodiments may include any number and/or arrangement of processors, cores, and/or additional components (e.g., buses, storage media, connectors, power components, buffers, interfaces, etc.). It is contemplated that specifics in the examples shown in FIGS. 1, 2, 3A, and 3B may be used anywhere in one or more embodiments.

Figure 4:
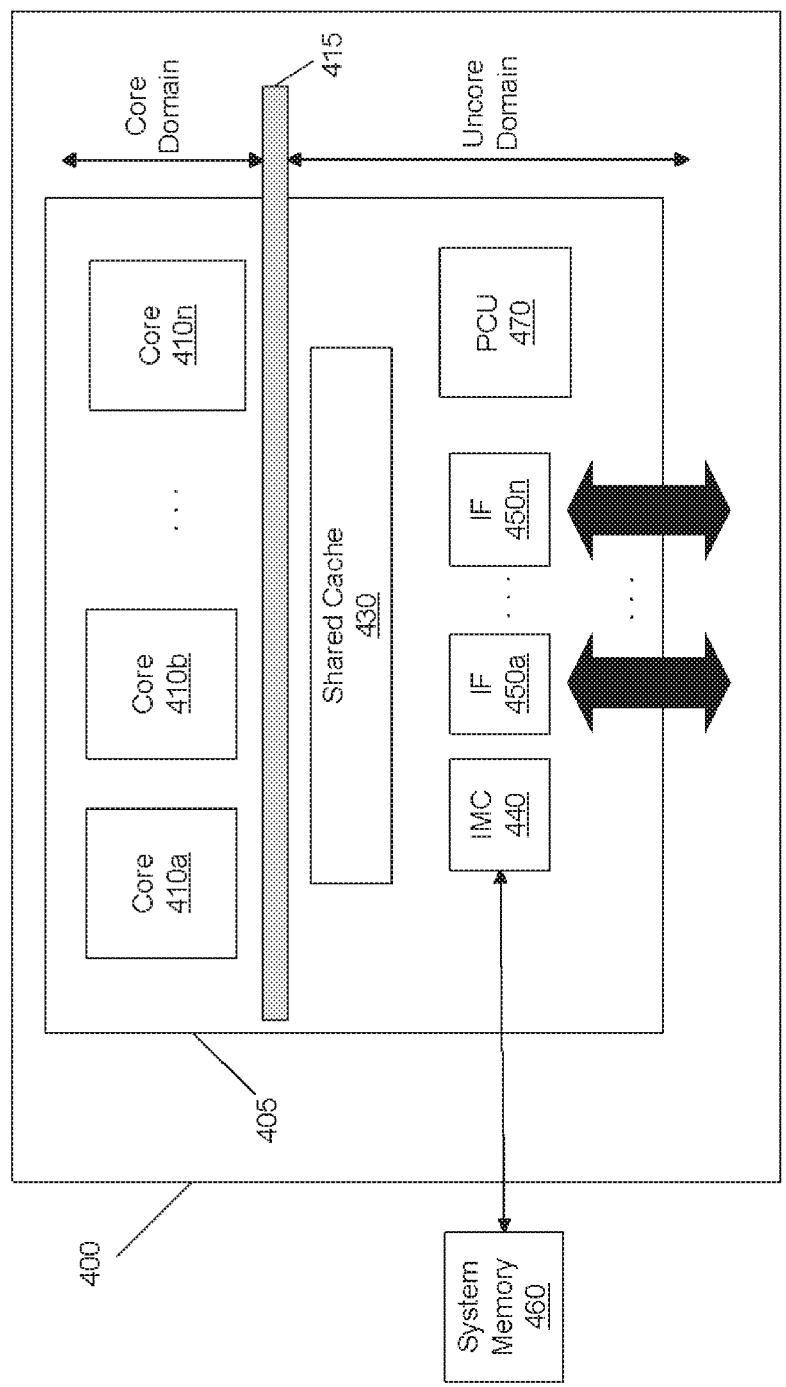
FIG. 4 is a block diagram of a processor in accordance with an embodiment of the present invention.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain that includes various components. As seen, the uncore domain may include a shared cache 430. In addition, the uncore may include an integrated memory controller 440, a power control unit (PCU) 470, and various interfaces 450. The PCU 470 may include some or all of the functionality of the processor power unit 107 described above with reference to FIG. 1. Although not shown for ease of illustration in FIG. 4, in some embodiments, each of the cores 410a-410n may be associated with a core power unit 120 shown in FIGS. 1 and 2.

With further reference to FIG. 4, the processor 400 may communicate with a system memory 460, e.g., via a memory bus. In addition, by interfaces 450, connection can be made to another processor, or various off-package components such as peripheral devices, mass storage and so forth. While shown with this particular implementation in the embodiment of FIG. 4, the scope of the present invention is not limited in this regard.

Figure 5:
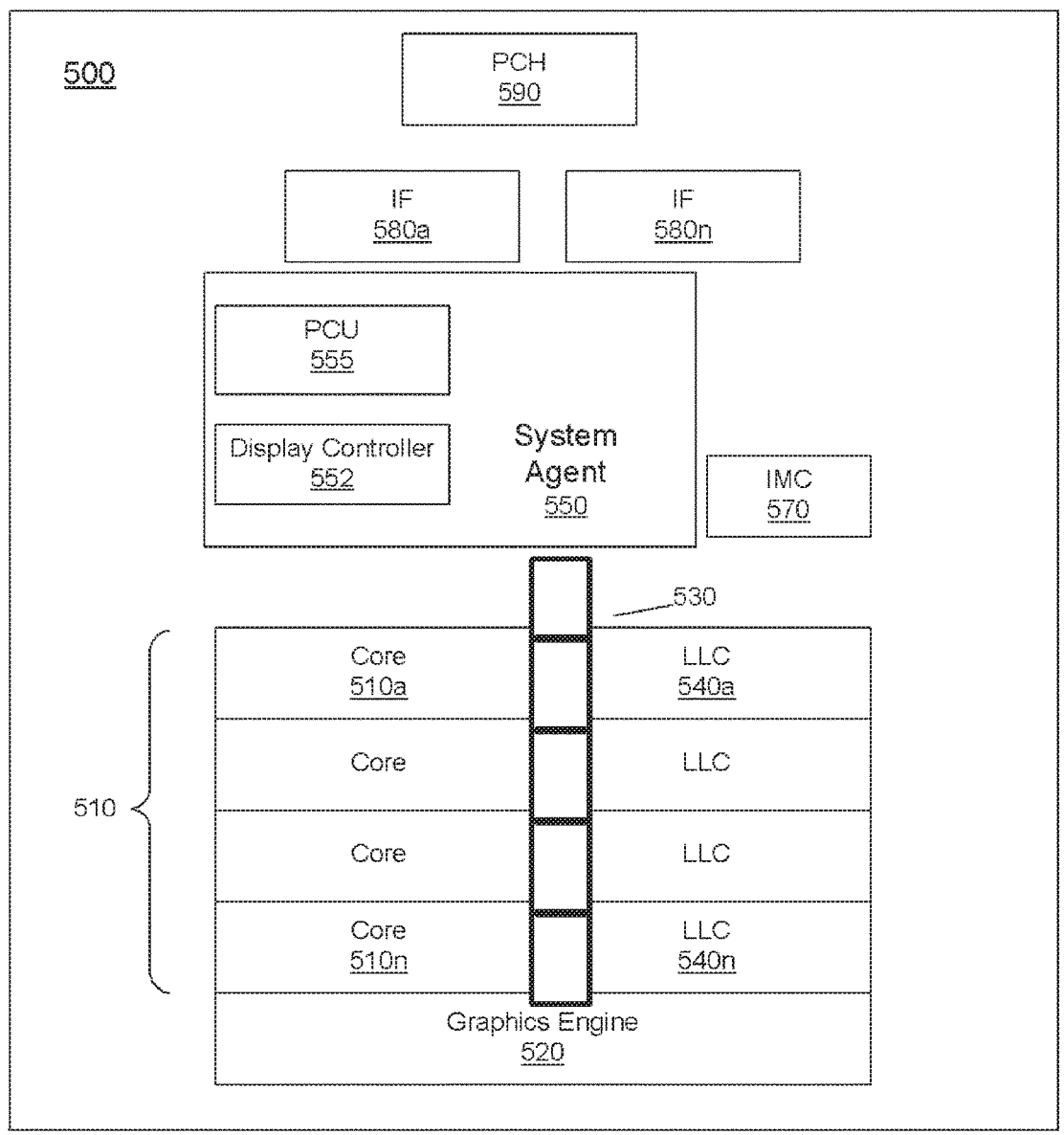
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) 540a-540n. In various embodiments, LLC 540 may be shared amongst the cores and the graphics engine, as well as various media processing circuitry.

As seen, a ring interconnect 530 thus couples the cores together, and provides interconnection between the cores, graphics domain 520 and system agent circuitry 550. In some embodiments, the ring interconnect 530 may be a multiplexor or crossbar device. In the embodiment of FIG. 5, system agent domain 550 may include display controller 552 which may provide control of and an interface to an associated display. As further seen, system agent domain 550 may also include a power control unit 555 to allocate power to the CPU and non-CPU domains. In some embodiments, the power control unit 555 may include some or all of the functionality of the processor power unit 107 shown in FIG. 1. Further, in some embodiments, each of the cores 510a-510n may include some or all of the functionality and/or components of the core power unit 120 shown in FIGS. 1 and 2.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor 500, and can be implemented on a separate die, in some embodiments. Alternatively, in some embodiments, the PCH 590 may be external to the processor 500. Although shown at this high level in the embodiment of FIG. 5, understand the scope of the present invention is not limited in this regard.

Figure 6:
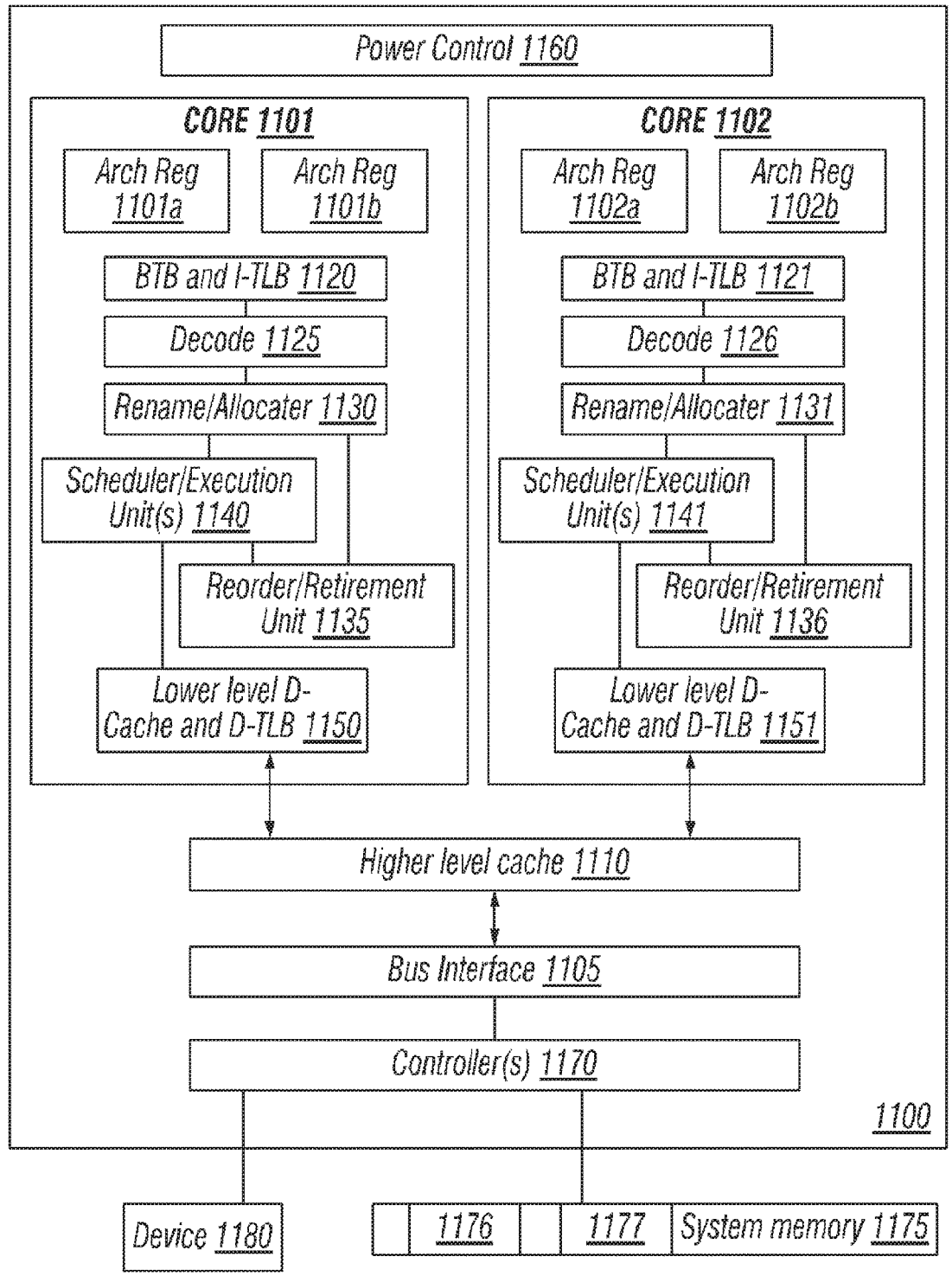
FIG. 6 is a block diagram of an embodiment of a processor including multiple cores.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric. Although not shown for ease of illustration in FIG. 6, in some embodiments, each of the cores 1101 and 1102 may be associated with a core power unit 120 shown in FIGS. 1 and 2.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above.

As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. As a result of the recognition by decoders 1125, the architecture or core 1101 takes specific, predefined actions to perform tasks associated with the appropriate instruction (e.g., one or more of the actions shown in FIGS. 3A-3B). It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power management in accordance with an embodiment of the present invention. In some embodiments, the power controller 1160 may include some or all of the functionality of the processor power unit 107 shown in FIG. 1.

Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 7:
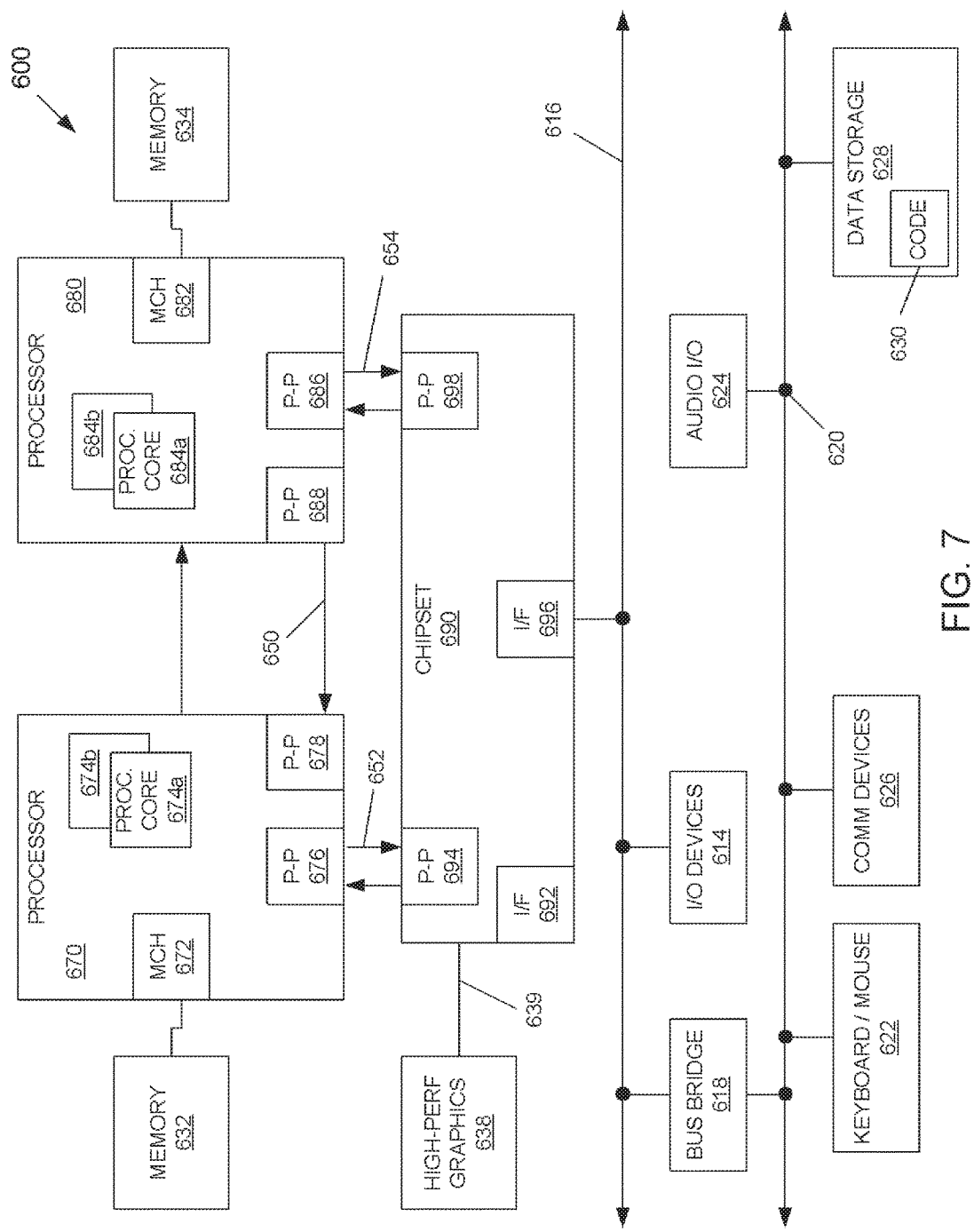
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Although not shown for ease of illustration in FIG. 7, in some embodiments, each of the processors 670, 680 can be associated with any part of the power unit 107 described above with reference to FIG. 1. Further, each of the processor cores 674, 684 may be associated with any part of the core power unit 120 shown in FIGS. 1 and 2.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, BiCMOS, CMOS, or NMOS.

It is contemplated that the processors described herein are not limited to any system or device. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. In one example embodiment may be a processor including a plurality of cores. Each core may include a core power unit to detect one or more power management events, and in response to the one or more power management events, initiate a protected power management mode in the core. The software interrupts to the core may be disabled during the protected power management mode. The core may be to execute power management code during the protected power management mode.

In an example, the core power unit includes one or more event detectors to detect the one or more power management events.

In an example, the one or more power management events include at least one of a temperature event, a voltage event, and a timing event.

In an example, the core power unit includes an operating system interface to enable direct communication with an operating system. The software interrupts disabled during the protected power management mode may include interrupts not received through the operating system interface.

In an example, the core power unit includes protected power management mode logic to disable the software interrupts responsive to the at least one power management event.

In an example, the core power unit may be further to, in response to the at least one power management event, store an execution state of the core in one or more dedicated power management registers of the core power unit.

In an example, the software interrupts may include interrupts and exceptions.

In an example, the core power unit may include a dedicated memory to store the power management code. The core may be to, during the protected power management mode, directly access the dedicated memory without using intervening memory components.

In an example, the power management code may be implemented using macroinstructions.

In an example, the core power unit may be further to redefine a function of at least one instruction during the protected power management mode.

In another example embodiment may be a system, the system including a processor and a dynamic random access memory (DRAM) coupled to the processor. The processor may include a plurality of cores, each core including at least one event detector to detect one or more power management events, and protected power management mode logic. The protected power management mode logic may be to, responsive to the one or more power management events: initiate a protected power management mode in the core; store an execution state of the core; disable software interrupts to the core; and initiate execution of a power management program by the core.

In an example, the processor may include a processor power unit to coordinate power management across the plurality of cores.

In an example, the one or more power management events may include receiving a power management interrupt from an operating system.

In an example, each core may further include a plurality of dedicated power management registers to store an execution state of the core prior to entering the protected power management mode.

In an example, the protected power management mode logic may be further to redefine a meaning of at least one flag during the protected power management mode.

In another example embodiment may be a method, the method including: receiving, by protected power management mode logic of a core included in a processor, an indication of a first power management event; and based on the indication of the first power management event, initiating a protected power management mode in the core. Initiating a protected power management mode may include: storing an execution state of the core; disabling software interrupts to the core; and executing power management code by the core.

In an example, initiating the protected power management mode may include: setting a protected power management mode flag to indicate that the core is operating in the protected power management mode; and enabling one or more new instructions for use during the protected power management mode.

In an example, the method may further include: receiving, by the protected power management mode logic, an indication of a second power management event; and based on the indication of the second power management event, terminating the protected power management mode in the core.

In an example, terminating the protected power management mode may include: enabling software interrupts to the core; restoring the core according to the stored execution state; and setting a protected power management mode flag to indicate that the core is not operating in the protected power management mode.

In an example, the method may further include redefining a function of at least one instruction during the protected power management mode.

In an example, the method may further include redefining a meaning of at least one flag during the protected power management mode.

In an example, the method may further include storing, using a plurality of dedicated power management registers, an execution state of the core prior to entering the protected power management mode.

In an example, the method may further include detecting the first power management event using an event detector.

In another example embodiment may be a communication device may be arranged to perform the method of any of the above examples.

In another example embodiment may be at least one machine readable medium may include a plurality of instructions that in response to being executed on a computing device, cause the computing device to carry out the method of any of the above examples.

In another example embodiment may be an apparatus for processing instructions is configured to perform the method of any of the above examples.

In another example embodiment may be an apparatus comprising means for performing the method of any of the above examples.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A processor comprising:
a processing engine; and
a power unit to:
   detect one or more power management events; and
   in response to the one or more power management events:
      initiate a protected power management mode in the processing engine, and
      intercept software interrupts prior to delivery to the processing engine during the protected power management mode,
      wherein, in response to an initiation of the protected power management mode by the power unit, the processing engine is to execute power management code stored in the processor during the protected power management mode, wherein the power unit comprises at least one hardware component.

2. The processor of claim 1, wherein the power unit is further to:
   set a protected power management mode flag to indicate that the processing engine is operating in the protected power management mode; and
   enable one or more new instructions for use during the protected power management mode.

3. The processor of claim 1, wherein the one or more power management events comprise at least one of a temperature event and a voltage event.

4. The processor of claim 1, wherein the power unit comprises an operating system interface to enable direct communication with an operating system.

5. The processor of claim 4, wherein the software interrupts intercepted during the protected power management mode comprise interrupts not received through the operating system interface.

6. The processor of claim 1, wherein the power unit comprises protected power management mode logic to intercept the software interrupts responsive to the at least one power management event.

7. The processor of claim 1, wherein the power unit is further to, in response to the at least one power management event, store an execution state of the processing engine in one or more dedicated power management registers of the power unit.

8. The processor of claim 1, wherein the power unit is to store the intercepted software interrupts during the protected power management mode.

9. The processor of claim 1, wherein the power unit comprises a dedicated memory to store the power management code, wherein the processing engine is to, during the protected power management mode, directly access the dedicated memory without using intervening memory components.

10. The processor of claim 1, wherein the power management code is implemented using macroinstructions.

11. The processor of claim 1, wherein the power unit is further to redefine a function of at least one instruction during the protected power management mode.

12. A system comprising:
a processor including a processing engine comprising:
at least one event detector to detect one or more power management events; and
protected power management mode logic to, responsive to the one or more power management events:
initiate a protected power management mode in the processing engine;
intercept software interrupts prior to delivery to the processing engine during the protected power management mode;
store an execution state of the processing engine; and
after an initiation of the protected power management mode, cause the processing engine to execute a power management program during the protected power management mode, wherein the protected power management mode logic comprises at least one hardware component; and
a dynamic random access memory (DRAM) coupled to the processor.

13. The system of claim 12, wherein the processor includes a processor power unit to coordinate power management across a plurality of processing engines.

14. The system of claim 12, wherein the one or more power management events comprise receiving a power management interrupt from an operating system.

15. The system of claim 12, the processing engine further comprising a plurality of dedicated power management registers to store an execution state of the processing engine prior to entering the protected power management mode.

16. The system of claim 12, wherein the protected power management mode logic is further to redefine a meaning of at least one flag during the protected power management mode.

17. A method, comprising:
receiving, by protected power management mode logic of a processing engine included in a processor, an indication of a first power management event, wherein the protected power management mode logic comprises at least one hardware component;
responsive to the indication of the first power management event, initiating, by the protected power management mode logic, a protected power management mode in the processing engine;
intercepting, by the protected power management mode logic, software interrupts before delivery to the processing engine;
storing, by the protected power management mode logic, an execution state of the processing engine; and
after initiating the protected power management mode, the protected power management mode logic causing the process engine to execute power management code during the protected power management mode.

18. The method of claim 17, further comprising:
setting a protected power management mode flag to indicate that the processing engine is operating in the protected power management mode; and
enabling one or more new instructions for use during the protected power management mode.

19. The method of claim 17, further comprising:
receiving, by the protected power management mode logic, an indication of a second power management event;
based on the indication of the second power management event, terminating the protected power management mode in the processing engine.

20. The method of claim 19, wherein terminating the protected power management mode comprises:
enabling software interrupts to the processing engine;
restoring the processing engine according to the stored execution state; and
setting a protected power management mode flag to indicate that the processing engine is not operating in the protected power management mode.

* * * * *